Oct. 22, 1940.　　A. H. CANDEE ET AL　　2,218,786
GEAR CUTTER
Filed Feb. 11, 1937　　4 Sheets-Sheet 1

Allan H. Candee
Ernest Wildhaber   Inventors

By Schlesinger
Attorney

Oct. 22, 1940.   A. H. CANDEE ET AL   2,218,786
GEAR CUTTER
Filed Feb. 11, 1937   4 Sheets-Sheet 2

Allan H. Candee
Ernest Wildhaber   Inventors

By   [signature]
                    Attorney

Oct. 22, 1940.  A. H. CANDEE ET AL  2,218,786

GEAR CUTTER

Filed Feb. 11, 1937  4 Sheets-Sheet 3

Allan H. Candee
Ernest Wildhaber  Inventors

By B. Schlesinger
Attorney

Oct. 22, 1940.   A. H. CANDEE ET AL   2,218,786
GEAR CUTTER
Filed Feb. 11, 1937   4 Sheets-Sheet 4

Allan H. Candee
Ernest Wildhaber Inventors

By
B. E. Shlesinger
Attorney

Patented Oct. 22, 1940

2,218,786

UNITED STATES PATENT OFFICE 2,218,786

GEAR CUTTER

Allan H. Candee, Rochester, and Ernest Wildhaber, Irondequoit, N. Y., assignors to Gleason Works, Rochester, N. Y., a corporation of New York Application Febuary 11, 1937, Serial No. 125,232

5 Claims. (Cl. 29—105)

The present invention relates to face-mill gear cutters such as are employed in the cutting of spiral bevel and hypoid gears. The invention includes both a novel method of relief-grinding the blades or teeth of such cutters and a novel type of blade or tooth.

One purpose of the present invention is to provide a blade or tooth for face-mill gear cutters which can be manufactured more accurately and maintained more accurate in form throughout its life than face-mill gear cutter blades ground by the relieving processes heretofore in use.

A further object of the invention is to provide an improved relieving process which will produce a blade or tooth that will cut more accurately than blades or teeth as relieved by previous relieving processes.

Still another object of the invention is to provide side surfaces on the teeth or blades of face-mill gear cutters which contain straight-line elements.

Other objects of the invention will be apparent hereinafter from the specification and from the disclosure of the accompanying drawings and the recital of the appended claims.

Figure 8:
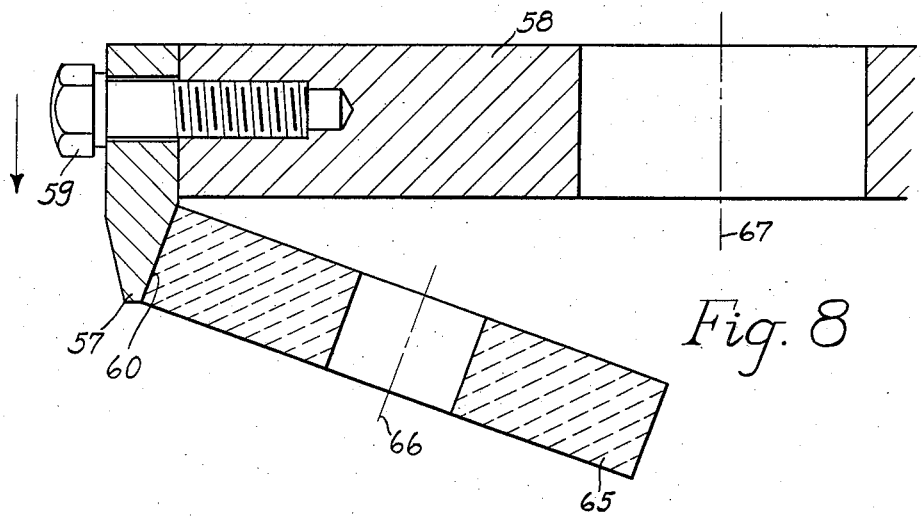
Figure 9:
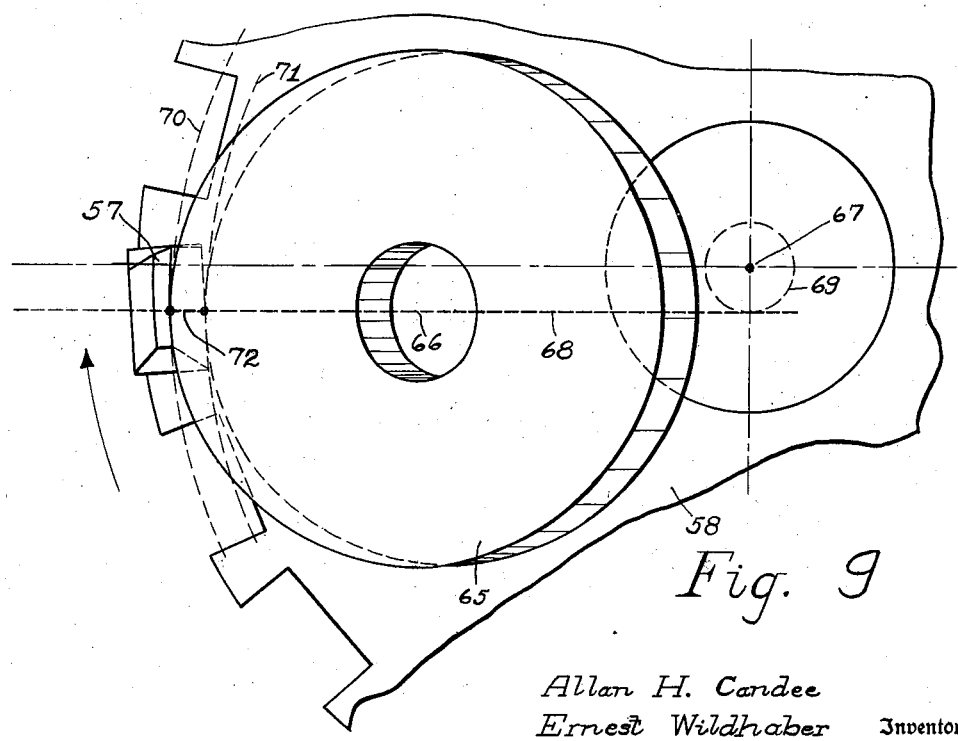
Figure 10:
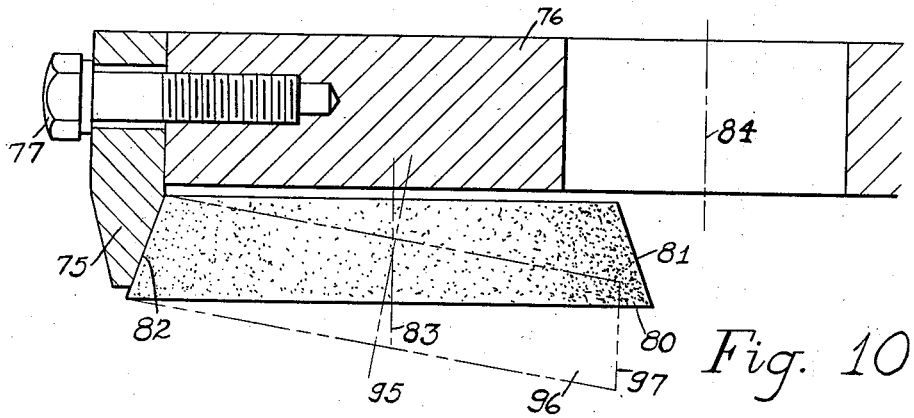
Figure 11:
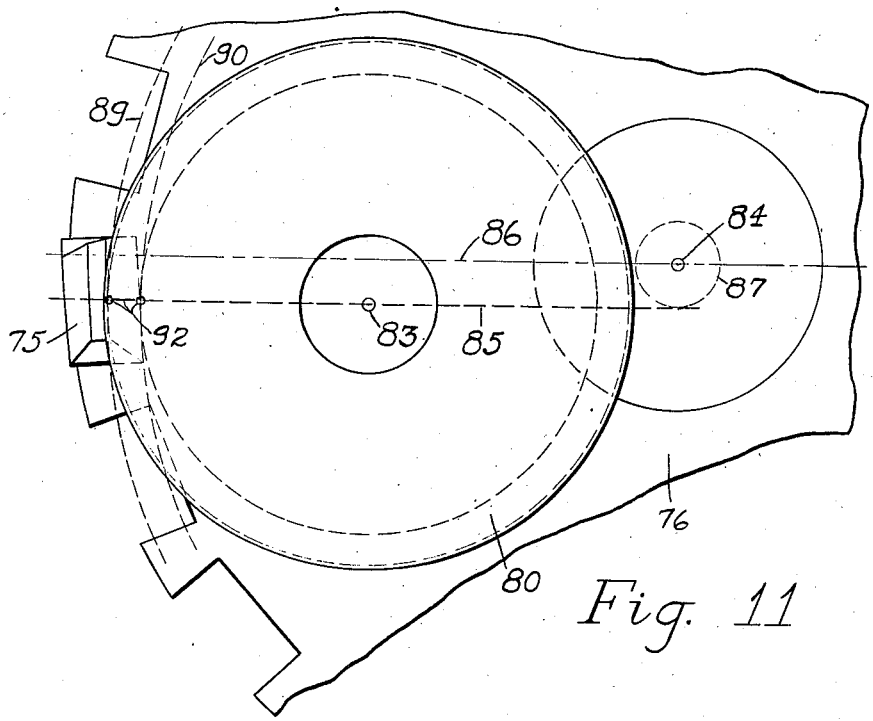

Figs. 8 and 9 are a fragmentary sectional view and a fragmentary plan view, respectively, illustrating the method of relieving the side surface of a blade according to another embodiment of this invention; and Figs. 10 and 11 are a fragmentary sectional view and a fragmentary plan view, respectively, illustrating the relieving of the side surface of a face-mill gear cutter blade according to still further embodiments of the invention.

In the cutting of a spiral bevel or hypoid gear, one or both members of the pair may be generated. Where both members of the pair are generated, it is common practice to generate them conjugate to a crown gear having teeth of theoretically straight profile and where only one member of the pair is generated, it is common practice to cut the non-generated member of the pair with teeth of theoretically straight profile and generate the other member of the pair conjugate to this mate gear. In the cutting of spiral bevel or hypoid gears, then, it is desirable to have a face-mill gear cutter which has blades of straight profile in an axial plane so that when this cutter is rotated on its axis, it may accurately trace a surface of straight profile. Thus, the cutter may cut teeth of straight profile in a form-cutting operation or may accurately represent a crown gear or a mate gear having teeth of straight profile in a generating operation.

Heretofore, face-mill gear cutter blades have been relief-ground by positioning the blades in a rotary head, engaging a cylindrical grinding wheel with the blades, with the axis of the wheel lying in a plane containing the axis of the head and inclined to the axis of the head at an angle approximately equal to the pressure angle of the side surfaces to be ground upon the blades, and rotating the head and the grinding wheel on their respective axes while effecting a relieving movement between the wheel and the head axially of the head. With this arrangement, however, it is not possible to grind a theoretically straight profile upon the cutting blades. Due to the relieving motion, the surface ground upon the blades is a helicoidal surface and a cylindrical grinding wheel cannot contact with such a surface along a straight line in an axial plane of the head. The surface ground upon the blades by the method heretofore employed, is of curved profile and varies with the diameter of the grinding wheel being used. The profile curvature is very slight, but it nevertheless affects the accuracy of the tooth surfaces which are cut.

With the present invention side surfaces are ground on the blades which are of involute helicoidal shape. Such surfaces are of straight profile, in a plane offset from the axis of the cutter. In an axial plane, the blades still have a slight profile curvature but only a fractional amount, a fourth or less, of what might otherwise exist on blades ground by previous processes. The profile curvature in the axial plane is in fact so slight, on a blade ground according to the present invention, as to be negligible and for all intents and purposes, the profile of the blades may be considered as straight also in an axial plane. Of greater importance, however, is the fact that the curvature still remaining is at all times constant and is not affected by the size of the grinding wheel used or by the amount the blades have been sharpened. It is within the concept of the present invention, moreover, to grind side surfaces on face-mill gear cutter blades which will be of absolutely straight profile in an axial plane of the cutter. With the present invention, then, it is possible to cut gears with teeth of straight profile within an extreme degree of accuracy or to absolute accuracy if desired or to represent such gears in a generating operation.

The present invention is capable of many different embodiments. In one embodiment, a conical grinding wheel may be employed. The wheel is positioned with its axis parallel to the axis of the head, in which the blades that are to be ground are mounted, and lying in a plane containing the axis of the head, and the wheel has its side surface dressed to a cone angle equal to the normal pressure angle of the side surfaces to be ground upon the blades. The grinding wheel and head are rotated upon their respective axes while an axial relieving movement is effected between the wheel and head. In another embodiment of the invention, a cylindrical grinding wheel is employed. This grinding wheel is positioned so that its axis is inclined to the axis of the head at an angle equal to the normal pressure angle of the side surfaces to be ground upon the blades, but the wheel is positioned so that its axis lies in a plane offset from the axis of the head and tangent to a cylinder circumscribed about the axis of the head. In still another embodiment of the invention, a conical grinding wheel is employed, having a cone surface whose cone angle is equal to the normal pressure angle of the side surfaces to be ground upon the blades and this wheel is positioned so that its axis lies in a horizontal plane offset from the horizontal plane containing the axis of the head. In a further embodiment of the invention, a conical grinding wheel is employed which has a side surface whose cone angle is less than the pressure angle of the side surfaces to be ground upon the blades and this grinding wheel is positioned in engagement with the blades so that its axis is inclined at such an angle to the axis of the head that the side surface of the wheel will produce the desired pressure angle on the side surfaces of the blades to be ground and the wheel is at the same time positioned so that its axis lies in a plane offset from the axis of the head and tangent to a cylinder circumscribed about the axis of the head. In all of these embodiments of the invention, the actual relieving operation is effected by rotating the grinding wheel on its axis while the head rotates on its axis at a uniform velocity and while simultaneously a relative relieving movement is produced between the wheel and head at a uniform velocity in a direction axial of the head.

In all these embodiments of the invention, then, when the correct positions and correct relieving motion are employed, relieved side surfaces will be ground upon the sides of the cutter blades which are involute helicoidal surfaces. Such surfaces have straight line elements, as indicated above, in planes offset from the axis of the head. If it is desired to have a theoretically straight profile on the blade in an axial plane, it is still possible to achieve this by dressing the grinding wheel with a slightly curved profile. For the outside surfaces of the blades, the grinding wheel will be dressed to have a slightly convex profile and for the inside surfaces of the blades, a slightly concave profile will be used.

Reference may now be had to the drawings for a more complete description of the invention. 15 denotes a face-mill gear cutter blade relieved according to this invention. The blade shown is intended for use in a cutter of the inserted-blade type, although the invention applies equally to cutters of the segmental type, where the blades or teeth are integral with segments which are secured to the cutter head, and to cutters where the blades or teeth are actually integral with the cutter head itself.

The blade shown is an inside cutting blade. It has a body portion which is adapted to be secured in a slot in the cutter head and a cutting portion which is adapted to project beyond the adjacent side face of the cutter head in the general direction of the axis of the cutter.

Figure 1:
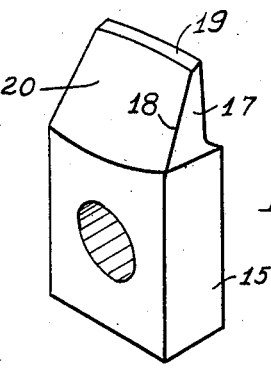
Figs. 1, 2, 3 and 4 are, respectively, perspective, plan, side and sectional views of a face-mill gear cutter blade made according to the present invention, Fig. 4 being a section on the line 4—4 of Fig. 3.
Figure 2:
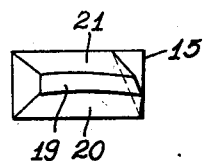
Figure 3:
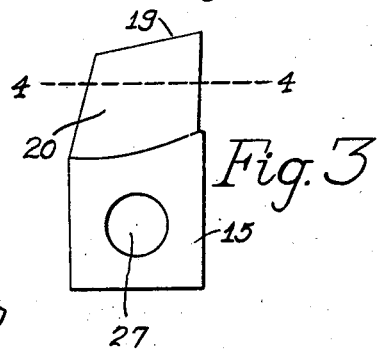
Figure 4:
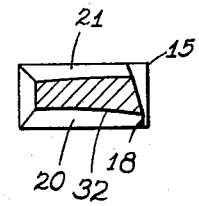

The front face 17 of the cutting portion of the blade is sharpened with a side rake, as clearly shown in Figs. 2 and 4, to provide the inside cutting edge 18 of acute angle. The top surface 19 and the side surface 20 of the blade are relieved back of the front face to provide cutting clearance. The relief on the top side of the blade may be provided in any usual or suitable manner. The present invention is concerned with the relieving of the side surfaces of the blade and particularly the side surface back of the side cutting edge. The side surface 21 of the blade, which is the non-cutting side of the blade, may be ground in any usual or suitable manner to provide the necessary clearance or, if desired, may also be ground as an involute helicoidal surface.

Figure 5:
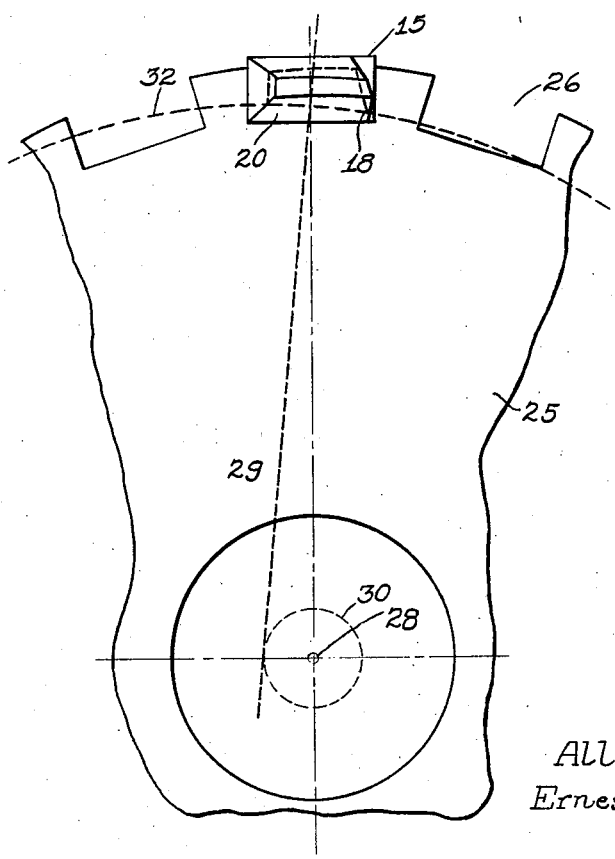
Fig. 5 is a fragmentary plan view of a face-mill gear cutter head with a blade made according to the present invention mounted therein.

For the relieving operation, the blade is secured as shown in Fig. 5, in a rotary head 25 which is provided with a plurality of blade-receiving slots 26. This head may be identical with that used for holding the blade during cutting and the blade may be secured in a slot 26 in the usual manner by a bolt which passes through the bolt opening 27 in the body portion of the blade and threads into the head.

The side 20 of the blade is ground as an involute helicoidal surface whose axis coincides preferably with the axis 28 of the cutter head 25, that is, the surface 20 is a surface such as might be produced by a straight line in a plane 29 which is tangent to a cylinder 30 that is circumscribed about the axis 28 and which is rotated about the cylinder 30 and simultaneously translated in the direction of the axis 28 of the cylinder while remaining tangent to the cylinder. The side surface 20 of the blade, then, contains a straight line element in any plane 29 offset from the axis 28 of the head and tangent to the cylinder 30, that is, the side surface 20 of the blade is of straight profile in such a plane offset from the cutter head axis 28. Also, the intersection of a plane perpendicular to the axis 28 of the cutter head, a plane such as shown in section in Fig. 4 or in dotted lines in Fig. 5, with the side surface 20 of the blade is an involute curve 32, that is, a curve such as might be traced by a point on a straight line lying in a plane 29 and rolling without slipping on a circle formed by the intersection of the cylinder 30 with that plane.

Figure 6:
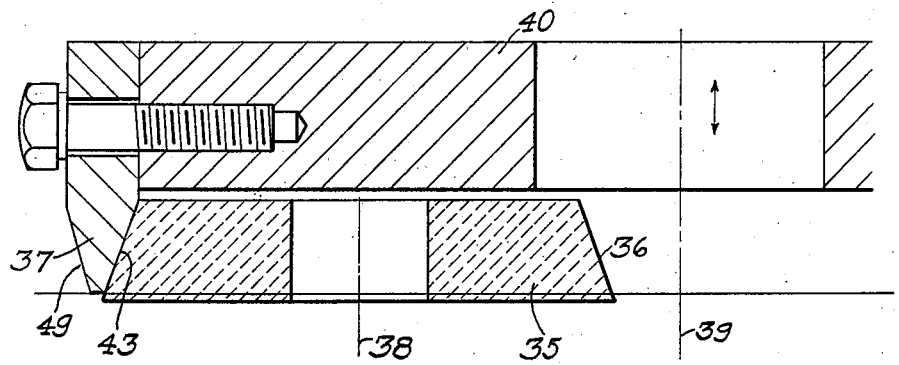
Figs. 6 and 7 are a fragmentary sectional view and a fragmentary plan view, respectively, illustrating the method of relieving the side surface of a face-mill gear cutter blade according to one embodiment of this invention.
Figure 7:
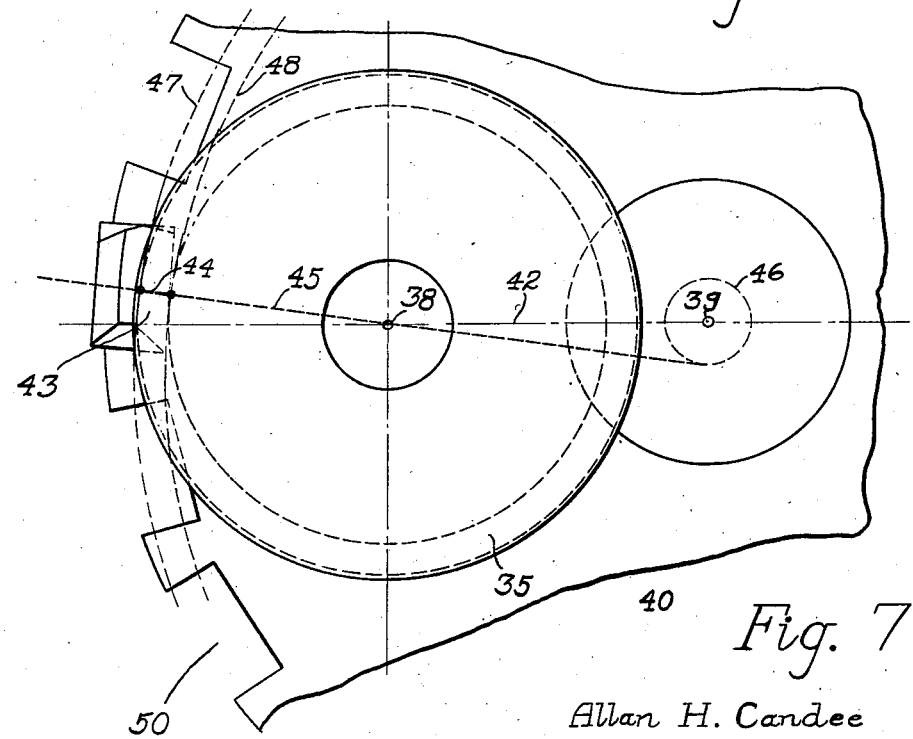

Various methods may be employed, as above indicated, for relief-grinding the side surface of blades according to the present invention. One method is shown in Figs. 6 and 7. Here a conical grinding wheel 35 is employed. This wheel is dressed so that the cone angle of the operating side surface 36 is equal to the normal pressure angle of the inside surface of the cutter blade or blades 37 to be ground and the grinding wheel 35 is positioned, therefore, so that its axis 38 is parallel to the axis 39 of the rotary head 40 in which the blades that are to be ground are secured.

To relief-grind an involute helicoidal surface on the inside of the blade 37, the grinding wheel 35 is brought into engagement with the inside surface of the blade and rotated on its axis 38 and at the same time the head 40 is rotated at a uniform velocity on its axis 39 and a relative relieving movement is produced between the head 40 and the grinding wheel 35 axially of the axis 39 and at a uniform velocity.

In Figs. 6 and 7, the grinding wheel 35 has been shown as positioned with its axis 38 lying in the same horizontal plane 42 as the axis 39 of the cutter head 40. The grinding wheel 35 contacts, however, with the inside surface 43 of the cutter blade 37 along a straight line 44 which lies in the plane 45 offset from the axis 39 of the cutter head and tangent to a cylinder 46 circumscribed about the axis 39 of the cutter head. Thus, as the cutter head rotates at a uniform velocity on its axis and the relative axial movement is produced between the cutter head and grinding wheel axially of the cutter head at a uniform velocity, the grinding wheel traces and grinds an involute helicoidal surface on the inside 43 of the cutter blade. This involute helicoidal surface is denoted by the lines 47 and 48 in Fig. 7 which contain the topmost and bottommost lines of the cutting portion of the side surface 43 of the blade. The side surface 43 of the blade is, therefore, of straight profile 44 in the plane 45. In this case, the offset of the plane 45 is produced automatically without any setting adjustment and depends only upon the angle of the conical wheel and the lead of the relieving motion.

The outside surface 49 of the blade 37 may also be ground to an involute helicoidal profile by positioning a conical grinding wheel to engage the outside surface of the blade, by rotating the wheel on its axis, and simultaneously producing a rotary motion between the wheel and head at a uniform velocity about the axis 39 of the head and effecting a relative movement between the wheel and head at a uniform velocity in the direction of the axis 39 of the head. The grinding wheel will, of course, be dressed as before so that the cone angle of the side surface will equal the normal pressure angle to be ground upon the outside surface of the blade.

In the drawings, only one blade has been shown for the purpose of clearness in illustration. It will be understood, however, that the head 40 is provided with a plurality of blade-receiving slots 50 and that a plurality of blades may be relief-ground simultaneously by positioning them in the head 40 and effecting the required relieving motion as each blade rotates past the grinding wheel.

Another way of relief-grinding involute helicoidal surfaces upon the sides of face-mill gear cutter blades is shown in Figs. 8 and 9. Here a cylindrical grinding wheel 65 is employed. The blade or blades 57 to be ground are secured in a rotary head 58 by bolts 59. The inside surfaces 60 are shown being relief-ground. The grinding wheel employed is a cylindrical grinding wheel 65 and it is positioned so that its axis 66 is inclined to the axis 67 of the head 58 at an angle equal to the normal pressure angle of the inside surface 60 of the blade. Further, the wheel is positioned so that its axis 66 lies in a plane 68 which is offset from the axis 67 of the head and is tangent to a cylinder 69 circumscribed about the axis of the head. In the relief-grinding operation, the wheel is rotated on its axis, a relative rotary movement is produced between the wheel and head about the axis 67 of the head and a relative axial movement is effected between the wheel and head in the direction of the axis 67 of the head. The relative rotary and translatory movements are at uniform velocities and are at such rates that an involute helicoidal surface is ground on the inside 60 of the blade. This helicoidal surface is denoted by the lines 70 and 71 in Fig. 9, which pass through the tip and bottom of the cutting portion of the side surface 60 of the blade 57. The cylindrical grinding wheel 65 contacts with this surface along the straight line 72 which lies in the plane 68 offset from the axis 67 of the cutter head and the blade surface 60 is of straight profile in this plane. The outside surface of the blade may also be ground as an involute helicoidal surface by positioning a cylindrical grinding wheel at the proper angle with reference to the axis of the head and with the axis of the wheel lying in a plane offset from the axis of the head and effecting relative rotary and translatory movements such as already described.

A further method of relief-grinding face-mill gear cutter blades according to the present invention is shown in Figs. 10 and 11. The blade to be ground is denoted at 75. It is secured in a rotary head 76 by a bolt 77. Again the invention is illustrated in connection with the grinding of the inside surface of the blade. The grinding wheel used is a conical grinding wheel 80 having its operating side surface 81 dressed at an angle to produce the correct pressure angle on the inside surface 82 of the blade when the grinding wheel is positioned so that its axis 83 is parallel to the axis 84 of the head 76.

The method illustrated in Figs. 10 and 11 distinguishes from the method shown in Figs. 6 and 7 in the respect that the wheel is positioned so that its axis 83 lies in a horizontal plane 85 which is offset from the horizontal plane 86 that contains the axis 84 of the cutter head and in the respect that the line of contact between the blade surface and the wheel remains continuously in the same offset plane though the wheel diameter be decreased by repeated dressings. The relief-grinding operation itself is effected, as before; the grinding wheel is rotated on its axis 83 in engagement with the inside surface 82 of the blade, relative rotary movement is produced between the wheel and blade about the axis 84 of the cutter head and simultaneously a relative translatory movement is produced between the wheel and blade in the direction of the axis 84 of the head. The relative rotary and translatory movements are effected at uniform velocities and in such ratio that an involute helicoidal surface is ground on the inside of the cutter blade such as might be produced by a straight line lying in a plane 85 which is tangent to a cylinder 87 that is circumscribed about the axis 84 of the cutter head as that plane 85 rotates about the axis 84 of the head and is simultaneously moved in the direction of that axis while remaining tangent to the cylinder.

The involute helicoidal surface ground on the inside of a cutter blade is denoted by the lines 89 and 90 in Fig. 11, which pass, respectively, through the tip and bottom of the cutting portion of the inside surface of the blade. The grinding wheel 80 contacts with this involute helicoidal surface along the straight line 92 which lies in the plane 85. The inside surface of the blade 75 is, therefore, of straight profile in this offset plane. The outside surface of the blade may be ground in a manner similar to that just described by positioning the grinding wheel to engage the outside surface of the blade and effecting relative rotary and translatory movemenst such as described.

There is a still further method of grinding involute helicoidal surfaces upon cutter blades. A conical grinding wheel may be employed, but the grinding wheel may be positioned, as shown in dotted lines in Fig. 10, so that its axis 95 is inclined to the axis 84 of the cutter. Here the grinding wheel 96 has its operating side surface 97 dressed to an angle less than the pressure angle of the inside surface 82 of the blade and the proper pressure angle is obtained by inclining the wheel to the axis of the cutter head.

In this case, as in the case just described, the grinding wheel is positioned with its axis 95 lying in a plane, such as the plane 85, offset from the axis 84 of the cutter head and tangent to a cylinder, such as the cylinder 87 just described, circumscribed about the axis of the cutter head. The relieving operation is effected, as before, by rotating the grinding wheel on its axis, while rotating the head on its axis or otherwise producing a relative rotary movement between the wheel and head about the axis of the head and by effecting a relative translatory movement between the wheel and head in the direction of the axis 84 of the head. The wheel, as before, will contact with the relieved side surface of the blade along a straight line lying in a plane offset from the axis of the head and the blade will be of straight profile in this plane.

In all of the embodiments of the invention described, the grinding wheel is of straight profile and the surface ground upon the blade is of straight profile in a plane offset from the axis of the cutter head. In a plane radial of the axis of the cutter head, the blades are of slightly curved profile. This curvature, however, is so slight that it is negligible. If it is desired, however, for any reason, to grind a truly straight profile on the cutter blade in an axial plane of the cutter head, this can still be done by dressing the grinding wheel with a slightly curved profile. For the grinding of the inside surfaces of the cutter blades, the wheel should be dressed to a slightly concave profile and for the grinding of the outside surfaces of the blades, the wheel should be dressed to a slightly convex profile.

In any of the embodiments of the invention illustrated, the blades to be ground may be circularly arranged in the cutter head and the axial relieving movement effected as each blade is moved past the grinding wheel or the blades may be helically arranged upon a rotary head and the relieving effected by imparting only one axial movement as a group of blades pass across the wheel. For the circular arrangement, a machine such as illustrated in the patent to James E. Gleason, No. 1,285,124 of November 19, 1918, may be employed and for the helical arrangement, a machine such as illustrated in the Durkan Patent No. 1,906,845 of May 2, 1933, may be employed, the grinding wheel or wheels for grinding the side surfaces of the blades being arranged in either case according to the present invention.

The invention has been illustrated, moreover, in connection with the grinding of blades intended for use in cutters of the inserted-blade type. It will be understood, however, that the invention may also be employed for relief-grinding of the cutting teeth or blades of segments intended for use upon a face-mill gear cutter of the segmental type. The invention may also be employed in the relief-grinding of the teeth or blades of a face-mill gear cutter in which the blades are integral with the body of the cutter head.

It will be understood, further, that while a number of different embodiments of the invention have been illustrated, the invention is capable of still further modification and this application is intended to cover any variations, uses, or adaptations of the invention and including such departures from the present disclosure as come within known or customary practice in the gear art and as may be applied to the essential features hereinbefore set forth and as fall within the scope of the invention or the limits of the appended claims.

Having thus described our invention, what we claim is:

1. A face-mill gear cutter comprising a rotary head and a plurality of cutting blades which project beyond one side face of the head in the direction of the axis of the head, said blades having side cutting edges which lie in a surface of revolution concentric to the axis of said head, and said blades having helically relieved side surfaces which are curved from front to rear and contain straight-line elements lying in planes which are parallel to but offset from the axis of the head.

2. A face-mill gear cutter comprising a rotary head and a plurality of cutting blades which project beyond one side face of the head in the general direction of the axis of the head, said blades having side cutting edges that lie in a surface of revolution concentric to the axis of the head and said blades having relieved side surfaces which are curved from front to rear and are involute helicoidal surfaces.

3. A face-mill gear cutter blade having a relieved side surface which is curved from front to rear and of positive pressure angle and which is an involute helicoidal surface, whose straight line elements extend from top to bottom of the blade, said blade having a side-cutting edge formed at the intersection of said side surface and the front face of the blade.

4. A face-mill gear cutter comprising a rotary head and a plurality of cutting blades which project beyond one side face of the head in the general direction of the axis of the head, said blades having side-cutting edges which lie in a surface of revolution concentric to the axis of the head, said blades having relieved side surfaces which are curved from front to rear and are of positive pressure angle and which are involute helicoidal surfaces.

5. A face-mill gear cutter comprising a rotary head and a cutting blade or tooth which projects beyond one side face of the head in the general direction of the axis of the head and which has a relieved side surface of positive pressure angle so curved from front to rear that the intersection of the side surface with a plane perpendicular to the axis of the head is an involute of a circle, and which has a side-cutting edge formed by the intersection of said side face with the front face of the blade.

ALLAN H. CANDEE.
ERNEST WILDHABER.